United States Patent
Baum

(10) Patent No.: US 6,999,433 B2
(45) Date of Patent: Feb. 14, 2006

(54) METHOD OF REDUCING NEAR-END CROSSTALK IN AN MXU NETWORKING ARCHITECTURE

(75) Inventor: David Baum, Ramat Gan (IL)

(73) Assignee: Coppergate Communication Ltd., Tel Aviv (IL)

( * ) Notice: Subject to any disclaimer, the term of this patent is extended or adjusted under 35 U.S.C. 154(b) by 346 days.

(21) Appl. No.: 10/272,881

(22) Filed: Oct. 17, 2002

(65) Prior Publication Data

US 2004/0076174 A1 Apr. 22, 2004

(51) Int. Cl.
*H04Q 7/00* (2006.01)

(52) U.S. Cl. .................. 370/328; 370/338; 370/352; 370/401

(58) Field of Classification Search ............. 370/386, 370/503, 516, 401, 504, 465, 508, 509, 351–360, 370/328, 338
See application file for complete search history.

(56) References Cited

U.S. PATENT DOCUMENTS

| | | | | |
|---|---|---|---|---|
| 5,970,068 A | * | 10/1999 | Gray et al. | 370/395.5 |
| 5,982,767 A | * | 11/1999 | McIntosh | 370/352 |
| 5,991,311 A | | 11/1999 | Long et al. | 370/524 |
| 6,252,755 B1 | | 6/2001 | Willer | 361/119 |
| 6,393,052 B1 | | 5/2002 | Sadjadpour et al. | 375/222 |
| 6,526,581 B1 | * | 2/2003 | Edson | 725/74 |
| 6,678,316 B1 | * | 1/2004 | Helms et al. | 375/222 |
| 6,701,406 B1 | * | 3/2004 | Chang et al. | 710/310 |
| 6,704,317 B1 | * | 3/2004 | Dobson | 370/401 |
| 6,747,996 B1 | * | 6/2004 | Holloway et al. | 370/503 |
| 2002/0057717 A1 | * | 5/2002 | Mallory | 370/503 |
| 2003/0139151 A1 | * | 7/2003 | Lifshitz et al. | 455/91 |
| 2003/0147523 A1 | * | 8/2003 | Watson et al. | 379/344 |
| 2003/0214972 A1 | * | 11/2003 | Pollak et al. | 370/445 |

FOREIGN PATENT DOCUMENTS

WO 01/58124 8/2001

* cited by examiner

*Primary Examiner*—Zarni Maung
*Assistant Examiner*—Van Kim Nguyen
(74) *Attorney, Agent, or Firm*—Darby & Darby

(57) ABSTRACT

HPNA MxU network for an MxU, the MxU including a plurality of HPNA LANs, each of the HPNA LANs operating according to a synchronous communication specification. Each of the HPNA LANs includes a plurality of nodes, one of the nodes within each HPNA LAN being a gateway node, a selected one of the nodes within each HPNA LAN being defined a LAN-master node and each HPNA LAN is coupled with a WAN via the respective gateway node. The LAN-master nodes allow the gateway nodes to transmit within a selected HPNA LAN downstream signals during at least one time slot, and the LAN-master nodes allow the nodes other than the gateway nodes to transmit upstream signals within a selected HPNA LAN to the respective gateway or transmit HN signals within a selected HPNA LAN, between nodes other than the respective gateway nodes during at least another timeslot.

15 Claims, 12 Drawing Sheets

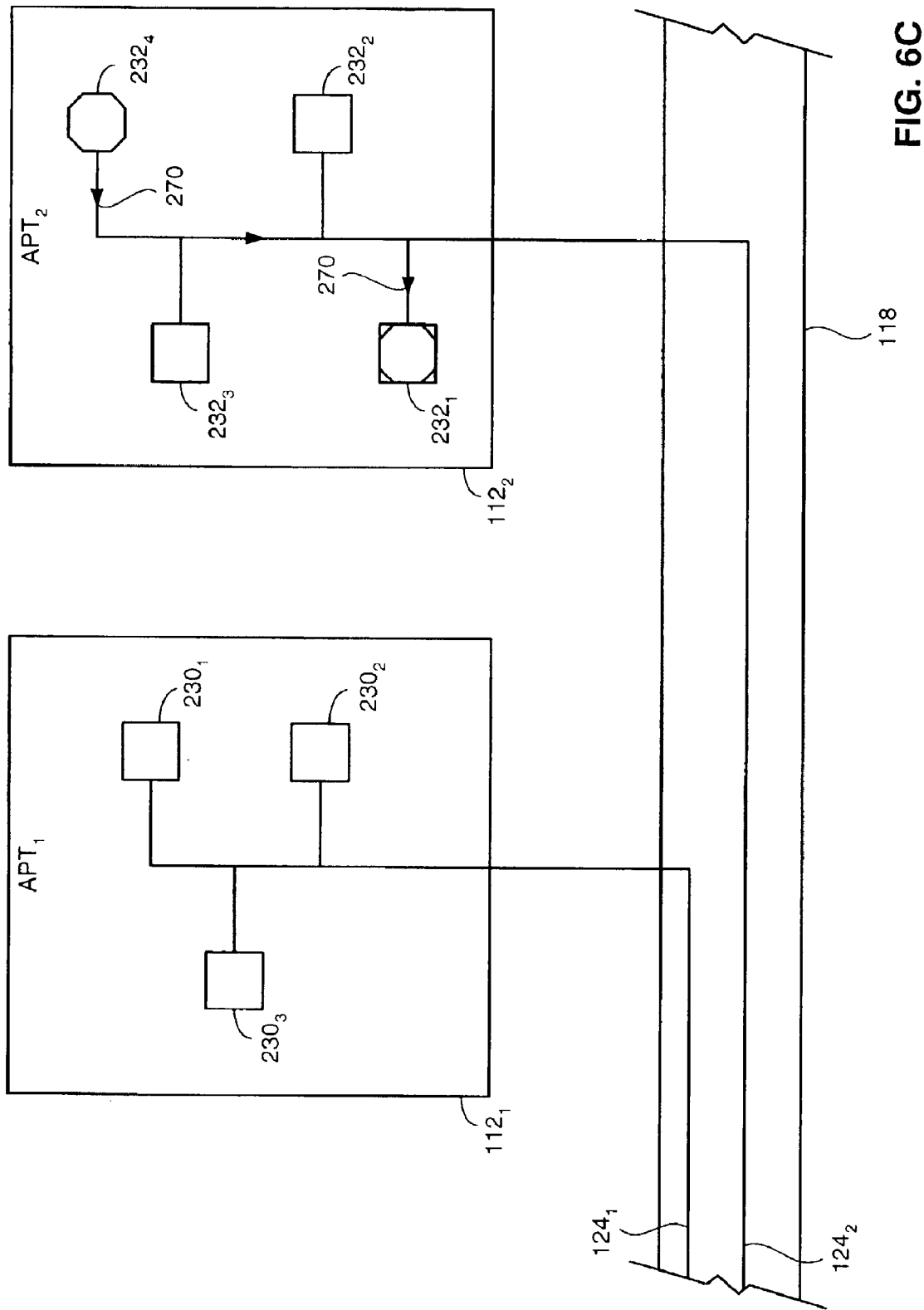

METHOD OF REDUCING NEAR-END CROSSTALK IN AN MXU NETWORKING ARCHITECTURE

FIELD OF THE DISCLOSED TECHNIQUE

The disclosed technique relates to communication networks in general, and to methods and systems for reducing near-end crosstalk in MxU networks, in particular.

BACKGROUND OF THE DISCLOSED TECHNIQUE

MxU networking architecture is known in the art and is used to provide communication services to a site (e.g., an apartment building) which includes a plurality of substantially independent sections (e.g., a plurality of apartments), each associated with a different subscriber. In general, the MxU networking architecture defines a separate local area network (LAN) for each of the sections.

MxU networks which are based Home Phoneline Networking Alliance (HPNA), use the telephone lines of the telephone wire network, already installed in the MxU. Each of the LANs includes the telephone wires which are associated with a selected section (e.g., apartment) and a plurality of HPNA nodes coupled with the telephone outlets. Telephone network voice communication and data communication services can be used simultaneously, using a technique known as frequency division multiplexing (FDM). Accordingly, data signals are transmitted using a different (higher) frequency than voice data signals, whereby these signals, can be separated using a frequency splitter.

A common problem in communication networks in general and MxU networks in particular, is interference between signals transmitted on adjacent communication lines, also known as crosstalk. Crosstalk is especially problematic when it is induced by a transmitter, transmitting over a communication line, to a nearby receiver which receives signals from an adjacent communication line. This type of crosstalk is known as near-end crosstalk (NEXT).

Methods and systems for reducing crosstalk in a network are known in the art. One conventional method for reducing NEXT is to use frequency division to separate between potentially interfering signals. Accordingly, signals transmitted in the upstream direction (i.e., from the user to the Central Office of the service provider) are transmitted using a different frequency than the signals transmitted in the downstream direction. For example, ADSL uses a lower frequency band for upstream communication and a higher frequency band for downstream communication.

Time division multiplexing (TDM) is a method, known in the art for preventing crosstalk between two different services (e.g., ISDN and ADSL). In a network using TDM, timeslots are defined for specific types of transmission and reception. For example, a certain timeslot may be allocated for transmission by one service, and a second timeslot for another service, whereby these transmissions do not interfere there between.

U.S. Pat. No. 5,991,311, entitled "Time-Multiplexed Transmission on Digital-Subscriber Lines Synchronized to Existing TCM-ISDN for Reduced Cross-Talk", issued to Long et al., is directed to a data-service-line (DSL) system for installing together with an existing Integrated Services Digital Network (ISDN) system, wherein the ISDN system uses time-compression multiplexing (TCM). The DSL system also uses TCM. This enables synchronizing the TCM-DSL system and the TCM-ISDN system, using a clock. All of the TCM-ISDN line cards and the TCM-DSL line cards of the central office, transmit during a first time window, and receive during a second time window.

Reference is now made to FIGS. 1A and 1B. FIGS. 1A and 1B schematically illustrate an apartment building network, generally referenced 10, which is known in the art. FIGS. 1A and 1B show a first and second example of NEXT in an MxU network, respectively. It is noted that FIGS. 1A and 1B are not drawn to scale.

With reference to FIG. 1A, apartment building network 10 includes intra-apartment networks $APT_1$ (referenced $12_1$), $APT_2$ (referenced $12_2$) and $APT_N$ (referenced $12_N$), gateways $G_1$ (referenced $22_1$), $G_2$ (referenced $22_2$) and $G_N$ (referenced $22_N$), and telephone twisted-pair wires $24_1$, $24_2$ and $24_N$. A telephone wire binder 18 runs from a basement 14 of the apartment building, to the vicinity of intra-apartment networks $12_1$, $12_2$ and $12_N$. A platform 16 is located in basement 14. Gateways $22_1$, $22_2$ and $22_N$ are mounted on platform 16. A broadband source 20 couples each of gateways $22_1$, $22_2$ and $22_N$ with a wide area network (WAN) such as the Internet, via a broadband link such as xDSL, cable, fiber-optic, satellite, Local Multipoint Distribution System (LMDS), and the like.

Each of intra-apartment networks $12_1$, $12_2$ and $12_N$ includes several network nodes (not shown), as shall be described in further detail with reference to FIG. 1C. Each one of gateways $22_1$, $22_2$ and $22_N$ is coupled with a respective one of intra-apartment networks $12_1$, $12_2$ and $12_N$, via respective telephone wires $24_1$, $24_2$ and $24_N$. Each combination of one of the gateways $22_1$, $22_2$ and $22_N$, the respective one of the telephone wires $24_1$, $24_2$ and $24_N$, and the respective one of intra-apartment networks $12_1$, $12_2$ and $12_N$, together form a respective one of local-area networks (LANs) $15_1$, $15_2$ and $15_N$. Telephone wires $24_1$, $24_2$ and $24_N$ are bound together in binder 18.

Gateway $22_1$ transmits a data signal 26 to intra-apartment network $12_1$. Simultaneously, intra-apartment network $12_2$ transmits another data signal 28 to gateway $22_2$. In a region 32, located in the vicinity of platform 16, an electrical disturbance 30, associated with data signal 26 (from telephone wire $24_1$), is induced in telephone wire $24_2$, causing an interference in data signal 28.

It is noted that conventionally, the distance between intra-apartment network $12_2$ and region 32 is significantly greater than the distance between gateway $22_1$ and region 32. Therefore, data signal 28 undergoes a significantly greater attenuation than data signal 26, before these data signals reach region 32, and hence, electrical disturbance 30 may cause a significant interference in data signal 28. This effect is known as near-end crosstalk (NEXT). It is noted that the transfer of disturbance 30 from telephone wire $24_1$ to telephone wire $24_2$ is a cumulative effect, which takes place all along wires $24_1$ and $24_2$, with a primary contribution occurring in region 32.

With reference to FIG. 1B, gateway $22_1$ transmits a data signal 50 to intra-apartment network $12_1$. Simultaneously, intra-apartment network $12_2$ transmits another data signal 52 to gateway $22_2$. In a region 56, located in the vicinity of intra-apartment networks $12_1$ and $12_2$, an electrical disturbance 54, associated with data signal 52 (from telephone wire $24_2$), is induced in telephone wire $24_1$, causing an interference in data signal 50.

It is noted that conventionally, the distance between gateway $22_1$ and region 56 is significantly greater than the distance between intra-apartment network $12_1$ and region 56. Therefore, data signal 50 undergoes a significantly greater attenuation than data signal 52, before these data signals reach region 56, and hence, electrical disturbance 54 may cause a significant interference in data signal 50.

Reference is further made to FIG. 1C, which is an illustration in detail of intra-apartment networks $12_1$ and $12_2$ of apartment building network 10 (FIGS. 1A and 1B) and a portion of the binder 18. FIG. 1C shows a third example of NEXT. It is noted that FIG. 1C is not drawn to scale.

Intra-apartment network $12_1$ includes network nodes $80_1$, $80_2$ and $80_3$. Nodes $80_1$, $80_2$ and $80_3$ are coupled there between via telephone wire $24_1$. Intra-apartment network $12_2$ includes nodes $82_1$ and $82_2$. Nodes $82_1$ and $82_2$ are coupled there between via telephone wire $24_2$.

Gateway $22_2$ (FIG. 1A) transmits a data signal 86, through telephone wire $24_1$, toward intra-apartment network $12_2$. Simultaneously, node $80_1$ transmits another data signal 88 toward node $80_2$.

It is noted that conventionally, data signal 88 includes a header with source and target attributes. All of the nodes of LAN $15_1$ (FIG. 1A) receive data signal 88, but only the target node, which is specified in the source-target attributes (i.e., node $80_2$) addresses and decodes the data signal. It is noted that in the description that follows and the accompanying drawings, except for the present example, data signals are only shown on their path to their intended receiving node.

Data signal 88 passes through telephone wire 24, toward binder 18. In a region 84 in the vicinity of intra-apartment networks $12_1$ and $12_2$, an electrical disturbance 92, associated with data signal 88 (from telephone wire $24_1$), is induced in telephone wire $24_2$, causing an interference in data signal 86. Similarly as in the example set forth in FIGS. 1A and 1B, electrical disturbance 92 may cause a significant interference in data signal 86.

SUMMARY OF THE DISCLOSED TECHNIQUE

It is an object of the disclosed technique to provide a novel HPNA MxU network architecture, which reduces NEXT and which overcomes the disadvantages of the prior art.

In accordance with the disclosed technique, there is thus provided an HPNA MxU network for an MxU, the MxU network comprising a plurality of HPNA LANs. Each of the HPNA LANs operates according to a synchronous communication specification. Each of the HPNA LANs comprises a plurality of nodes, one of the nodes being a gateway node, and a selected one of the nodes being defined a LAN-master node. Each of the HPNA LANs is coupled with a WAN, via the respective gateway node. Communication lines within the HPNA LANs, directly coupled to the gateway nodes, are at least partially bound together thereby susceptible to electromagnetic interference there between. The transmission direction within a selected HPNA LAN by the respective gateway node is defined downstream. The transmission direction within a selected HPNA LAN to the respective gateway node is defined upstream. The transmission direction within a selected HPNA LAN between nodes other than the respective gateway nodes, is defined HN. The LAN-master nodes allow the gateway nodes to transmit downstream signals during at least one timeslot, and upstream signals during at least another timeslot.

In accordance with another aspect of the disclosed technique, for at least one of the LANs, the respective gateway node is integrated with the respective LAN-master node. In accordance with a further aspect of the disclosed technique, the MxU network further includes a synchronizer, synchronizing the LAN-master nodes according to the timeslots.

In accordance with another aspect of the disclosed technique, each of the LANs operates according to a single timeslot scheme, simultaneously. In accordance with a further aspect of the disclosed technique, the timeslot scheme includes a downstream timeslot, allocated for transmission of downstream data signals, and an upstream+HN timeslot, allocated for transmission of upstream and HN data signals.

In accordance with another aspect of the disclosed technique, there is provided a method of reducing NEXT in an HPNA MxU network. The network includes a plurality of LANs. Each of the LANs includes a LAN-master node. The method includes the procedures of synchronizing the HPNA MxU network according to a timeslot scheme, which includes a plurality of timeslots, and during each of the timeslots, transmitting data signals of a selected type respective of the timeslot.

According to a further aspect of the disclosed technique, there is provided a synchronizer for synchronizing a plurality of HPNA MxU network LAN-masters there between. The synchronizer includes means for coupling with the LAN-masters, means for allocating timeslots to the LAN-masters, and means for timing the timeslots. The timeslots determine when each of a plurality of nodes of the HPNA MxU network are enabled to transmit upstream, downstream and HN data signals.

BRIEF DESCRIPTION OF THE DRAWINGS

The disclosed technique will be understood and appreciated more fully from the following detailed description taken in conjunction with the drawings in which:

FIG. 6C is an illustration in detail of two of the intra-apartment networks of the MxU FIG. 2, and a portion of the binder, at a third mode of the MxU network, in accordance with a further embodiment of the disclosed technique.

DETAILED DESCRIPTION OF THE EMBODIMENTS

The disclosed technique overcomes the disadvantages of the prior art by providing a synchronous MxU network, which assigns different timeslots for upstream and downstream communication.

In the description that follows, the terms MDU (multi-dwelling unit), MTU (multi-tenant unit), MCU (multi-company unit), MHU (multi-hospitality unit), MPU (multi-public unit), MEU (multi-embedded unit), are generally termed MxU. An MxU may be an apartment building, a condominium complex, a hotel, a motel, a resort, an office building, an industrial park, a college or university campus dormitory, a hospital, an airport, a train station, a convention center, a shopping mall, an airplane, a ship, and the like.

Figure 1A:
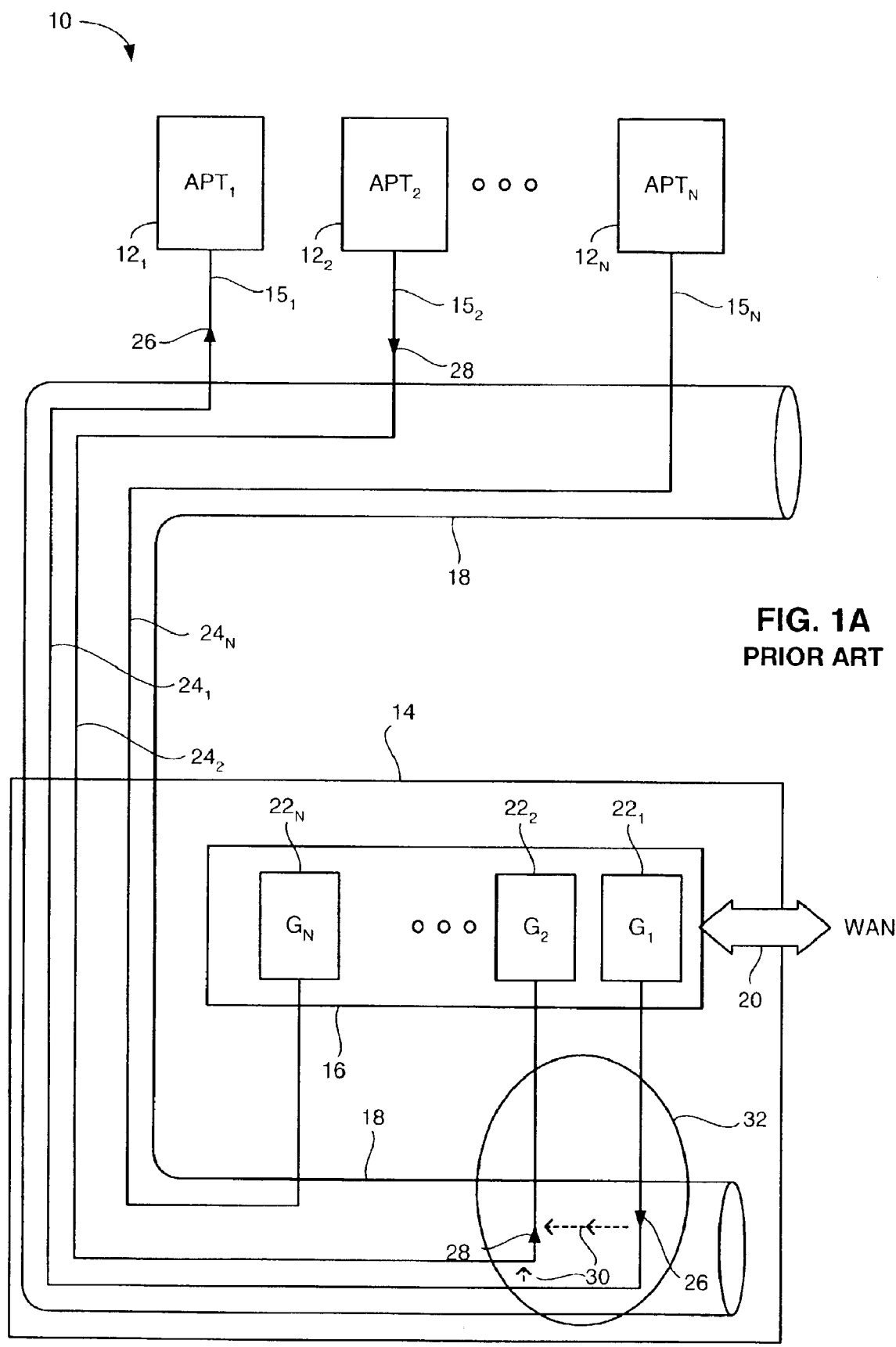
FIG. 1A is a schematic illustration of an apartment building network which is known in the art, showing a first example of NEXT.
Figure 1B:
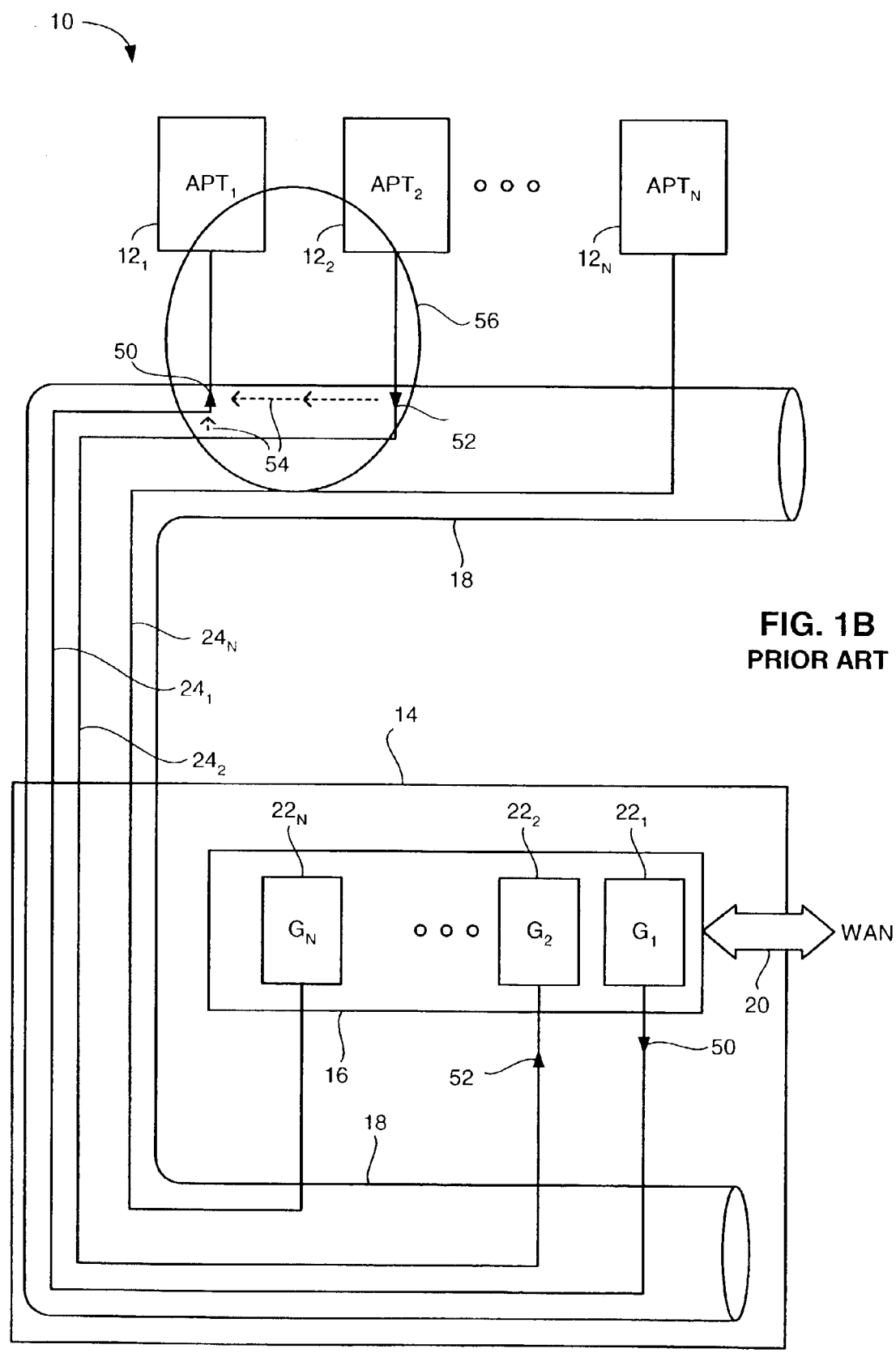
FIG. 1B is a schematic illustration of the apartment building network of FIG. 1A, showing a second example of NEXT.
Figure 1C:
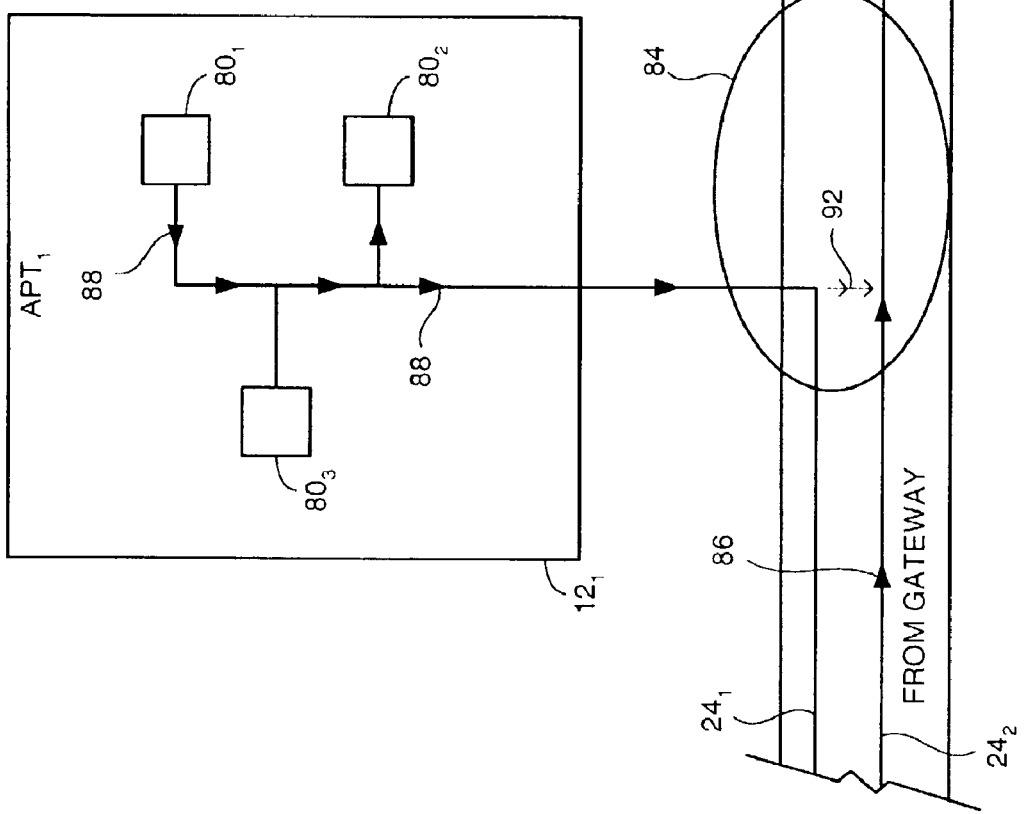
FIG. 1C is an illustration in detail of two of the intra-apartment networks of the apartment building of FIGS. 1A and 1B and a portion of the binder, showing a third example of NEXT.
Figure 2:
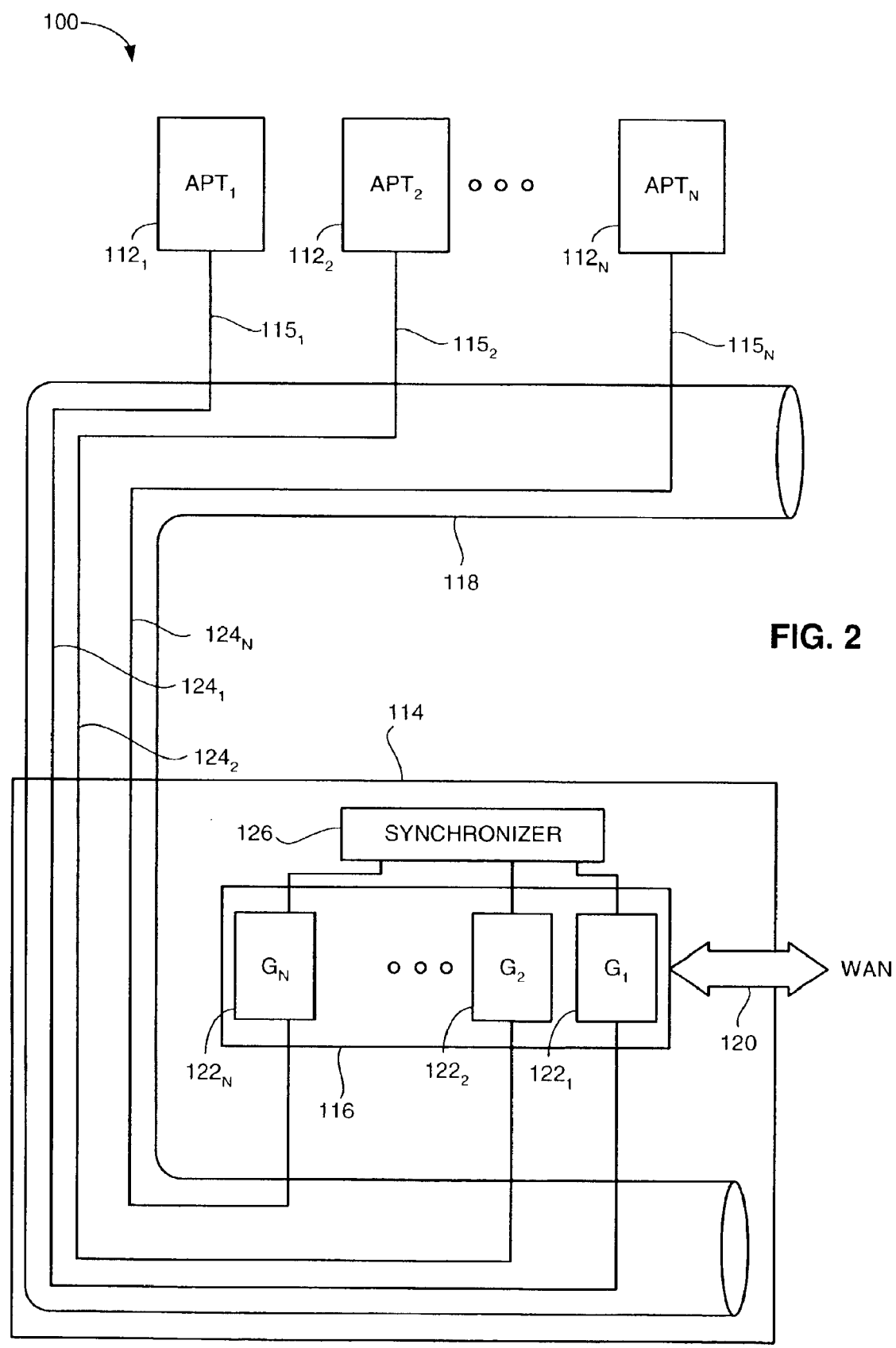
FIG. 2 is a schematic illustration of an MxU network, constructed and operative in accordance with an embodiment of the disclosed technique.

Reference is now made to FIG. 2, which is a schematic illustration of an MxU network, generally referenced 100, constructed and operative in accordance with an embodiment of the disclosed technique. It is noted that FIG. 2 is not drawn to scale. In the present example, MxU network 100 is an apartment building network. It is noted, however, that the disclosed technique is applicable for any type of MxU network.

Apartment building network 100 includes intra-apartment networks $APT_1$ (referenced $112_1$), $APT_2$ (referenced $112_2$) and $APT_N$ (referenced $112_N$), gateways $G_1$ (referenced $122_1$), $G_2$ (referenced $122_2$) and $G_N$ (referenced $122_N$), and telephone wires $124_1$, $124_2$ and $124_N$. A telephone wire binder 118 runs from a basement 114 of the apartment building, to the vicinity of intra-apartment networks $112_1$, $112_2$ and $112_N$. A platform 116 and a synchronizer 126, are located in communication room 114. Gateways $G_1$, $G_2$, and $G_N$, referenced $122_1$, $122_2$ and $122_N$, respectively, are mounted on platform 116. A broadband source 120 couples gateways $122_1$, $122_2$ and $122_N$ with a wide area network (WAN) such as xDSL, cable, fiber-optic, satellite, Local Multipoint Distribution System (LMDS), and the like. Synchronizer 126 is coupled with gateways $122_1$, $122_2$ and $122_N$.

In the present example, communication room 114 is a basement. It is noted, however, that communication room 114 may any physical space housing the gateways of the network, such as a basement, a cupboard, a cabinet, and the like.

Each of telephone wires $124_1$, $124_2$ and $124_N$ is a twisted-pair wire. Telephone wires $124_1$, $124_2$ and $124_N$ are also known as Plain Old Telephone Service lines (POTS lines). Telephone wires $124_1$, $124_2$ and $124_N$ are bound together in binder 118.

Platform 116 provides access to gateways $122_1$, $122_2$ and $122_N$, by multiplexing the broadband source 120. It is noted that platform 116 may further provide other functions to gateways $122_1$, $122_2$ and $122_N$, such as routing, switching, dynamic IP address assignment, voice access, power, and the like. For example, platform 116 may be a Digital Subscriber Line Access Multiplexer (DSLAM), a Next Generation Digital Loop Carrier (NGDLC), and the like.

Each of intra-apartment networks $112_1$, $112_2$ and $112_N$ includes several network nodes (not shown), as shall be described in further detail with reference to FIGS. 6A and 6B. Each combination of one of the gateways $122_1$, $122_2$ and $122_N$, the respective one of the telephone wires $124_1$, $124_2$ and $124_N$, and the respective one of intra-apartment networks $112_1$, $112_2$ and $112_N$, together form a respective one of local-area networks (LANs) $115_1$, $115_2$ and $115_N$.

Data signals transmitted from one of the gateways $122_1$, $122_2$ or $122_N$, to the respective intra-apartment network, are known as downstream data signals. Data signals transmitted from one of the intra-apartment networks $112_1$, $112_2$ and $112_N$, to the respective gateway, are known as upstream data signals. Data signals transmitted and received within one of the intra-apartment networks, are known as home networking (HN) data signals.

Each of gateways $122_1$, $122_2$ and $122_N$ operates as a master node of the respective one of LANs $115_1$, $115_2$ and $115_N$ (i.e., each gateway is a LAN-master). In other words, each gateway enables or disables the nodes in the respective LAN to transmit data signals. Synchronizer 126 synchronizes the gateways $122_1$, $122_2$ and $122_N$, so that LANs $115_1$, $115_2$ and $115_N$, transmit upstream, downstream and HN data signals in synchrony, as shall be described in further detail with reference to FIGS. 5A and 5B.

It is noted that synchronizer 126 may generally be coupled with gateways $122_1$, $122_2$ and $122_N$ via wired or wireless connections. It is further noted that synchronizer 126 may generally be located in various locations inside or outside of basement 114, and inside the apartment building or at a remote location.

Figure 3:
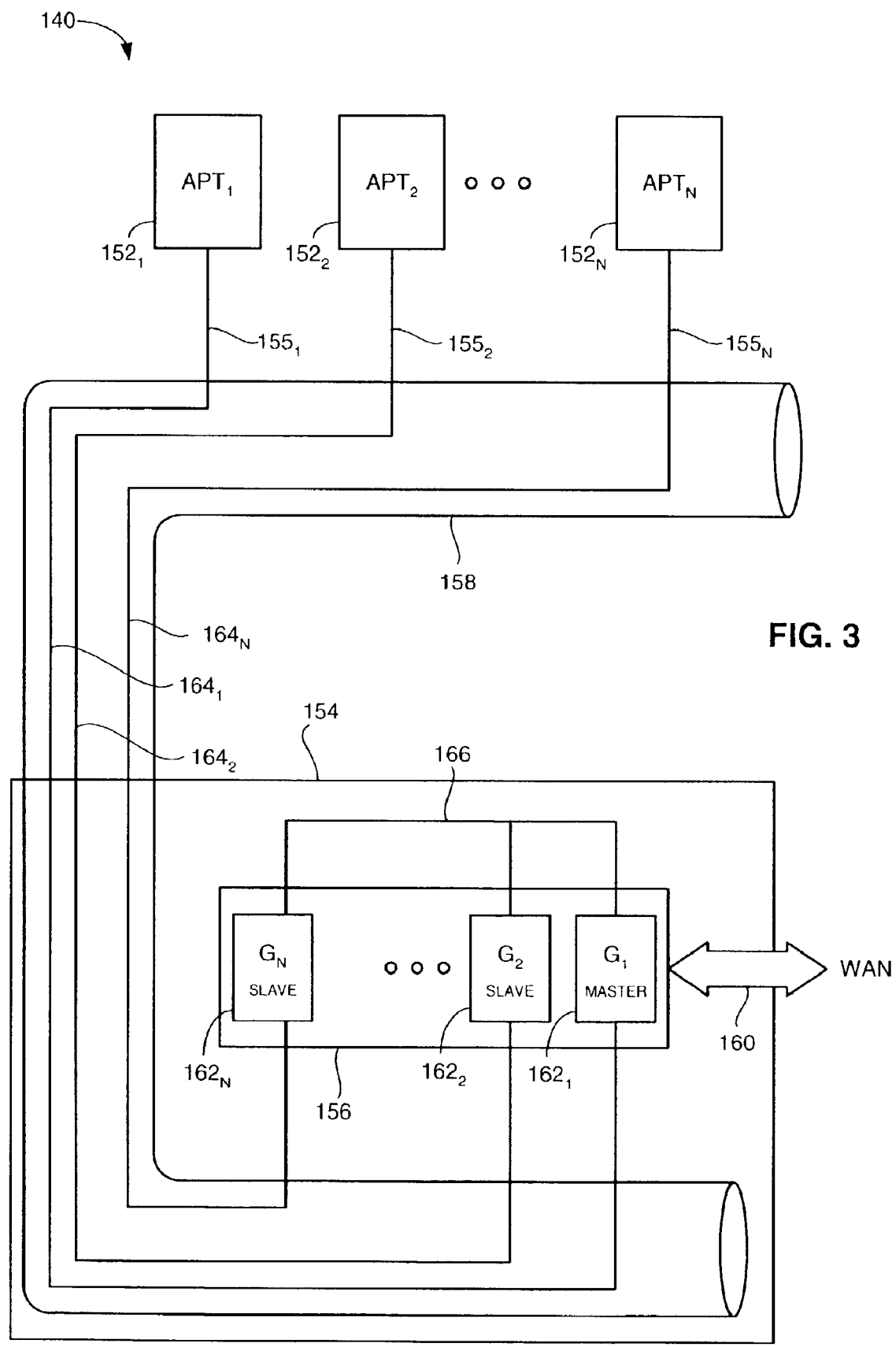
FIG. 3 is a schematic illustration of an MxU network, constructed and operative in accordance with another embodiment of the disclosed technique.

Reference is now made to FIG. 3, which is a schematic illustration of an apartment building network, generally referenced 140, constructed and operative in accordance with another embodiment of the disclosed technique. According to the architecture of network 140, the synchronizer is incorporated within one of the LAN-masters, whereby this LAN-master operates as a master relative to the other LAN-masters of the network.

Apartment building network 140 includes intra-apartment networks $APT_1$ (referenced $152_1$), $APT_2$ (referenced $152_2$) and $APT_N$ (referenced $152_N$), gateways $G_1$ (referenced $162_1$), $G_2$ (referenced $162_2$) and $G_N$ (referenced $162_N$), and telephone wires $164_1$, $164_2$ and $164_N$. A telephone wire binder 158 runs from a basement 154 to the vicinity of intra-apartment networks $152_1$, $152_2$ and $152_3$. Gateways $162_1$, $162_2$ and $162_N$ are mounted on a platform 156. A broadband source 160 couples gateways $162_1$, $162_2$ and $162_N$ with a WAN. The combinations of intra-apartment networks $152_1$, $152_2$ and $152_3$, telephone wires $164_1$, $164_2$ and $164_N$ and gateways $162_1$, $162_2$ and $162_N$ form LANs $155_1$, $155_2$ and $155_N$, similarly as in apartment building network 100 of FIG. 2.

Gateways $162_1$, $162_2$ and $162_N$ are coupled there between via a synchronicity link 166. It is noted that synchronicity link 166 may be wired or wireless. Gateway $162_1$ operates as a master gateway to the rest of the gateways, which operate as slave gateways (i.e., gateway $162_1$ controls when the other gateways, and the nodes of their respective LANs, transmit data signals). Gateway $162_1$ synchronizes the LANs to transmit upstream, downstream and HN data signals in synchrony, as shall be described in further detail with reference to FIGS. 5A and 5B.

Figure 4:
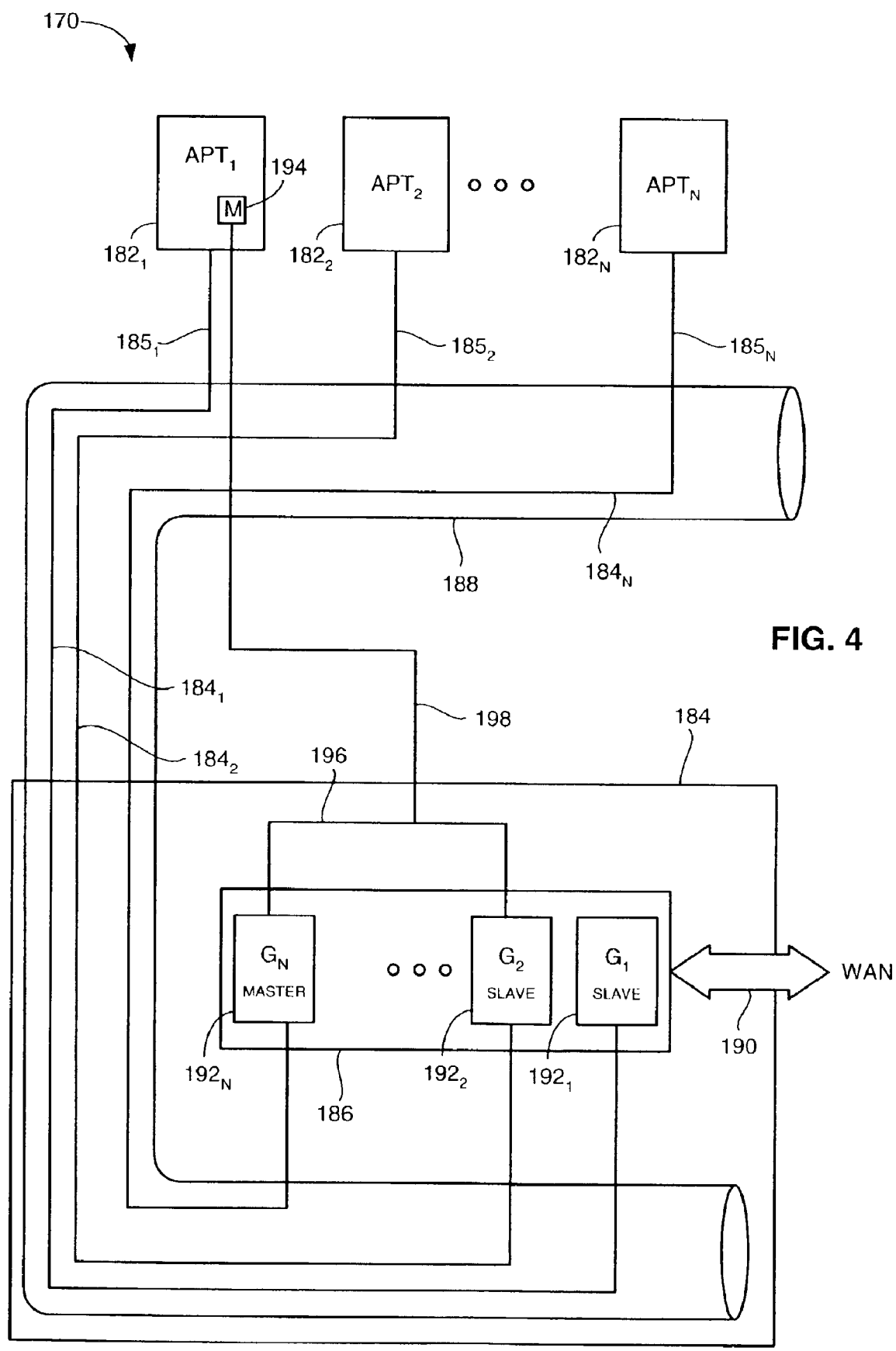
FIG. 4 is a schematic illustration of an apartment building network, constructed and operative in accordance with a further embodiment of the disclosed technique.

Reference is now made to FIG. 4, which is a schematic illustration of an apartment building network, constructed and operative in accordance with a further embodiment of the disclosed technique. Apartment building network 170 includes intra-apartment networks $APT_1$ (referenced $152_1$), $APT_2$ (referenced $152_2$) and $APT_N$ (referenced $152_N$), gateways $G_1$ (referenced $162_1$), $G_2$ (referenced $162_2$) and $G_N$ (referenced $162_N$), and telephone wires $164_1$, $164_2$ and $164_N$. A telephone wire binder 188 runs from a basement 184 to the vicinity of intra-apartment networks $182_1$, $182_2$ and $182_3$. Gateways $192_1$, $192_2$ and $192_N$ are mounted on a platform 186. A broadband source 190 couples gateways $192_1$, $192_2$ and $192_N$ with a WAN. The combinations of intra-apartment networks $182_1$, $182_2$ and $182_3$, telephone wires $194_1$, $194_2$ and $194_N$ and gateways $192_1$, $192_2$ and $192_N$ form LANs $185_1$, $185_2$ and $185_N$, similarly as in apartment building network 100 of FIG. 2. However, gateway $192_1$ does not operate as the master node of LAN $185_1$. Rather, a node 194 of intra-apartment network $182_1$ is the LAN-master node of LAN $185_1$.

LAN-master node 194 and gateways $192_2$ and $192_N$ are coupled there between via a synchronicity link 196. Gateway $192_N$ operates as a master gateway to the rest of the LANs, similarly as gateway $162_1$. However, gateway $192_N$ synchronizes LAN $185_1$ through LAN-master node 194 (and not through gateway $192_1$).

It is noted that alternatively, LAN-master node 194 may be linked directly to master gateway $192_N$. Further alternatively, a synchronizer such as synchronizer 126 of FIG. 2, may be applied to an apartment building network similar to apartment building network 170. Accordingly, LAN-master 194 is coupled to that synchronizer. It is further noted that the disclosed technique may similarly be applied to an MxU network wherein a plurality of LAN-master nodes are not gateways.

Figure 5A:
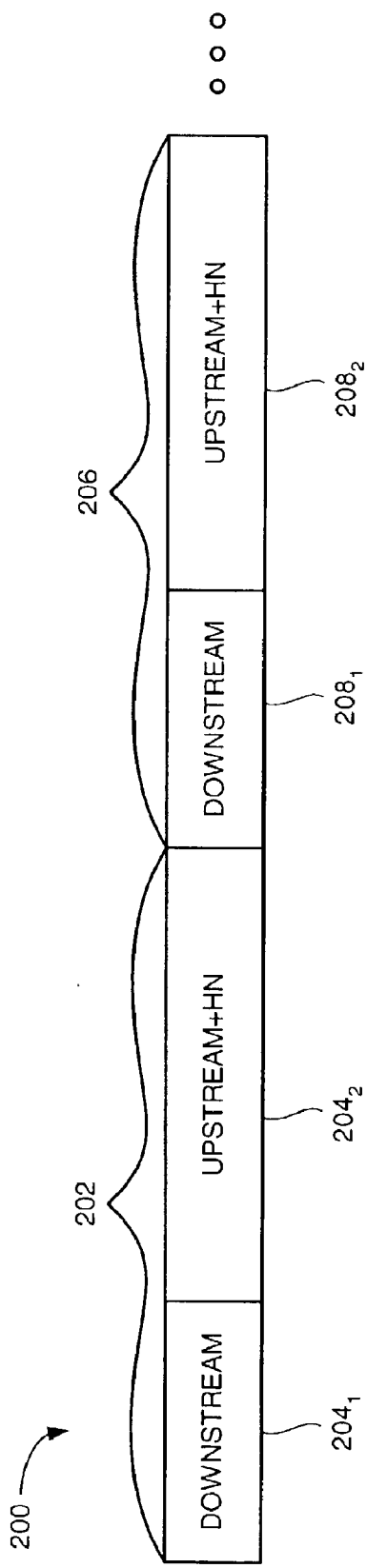
FIG. 5A is a schematic illustration of a timeslot scheme sequence, constructed in accordance with another embodiment of the disclosed technique.

Reference is now made to FIG. 5A, which is a schematic illustration of a timeslot scheme sequence 200, constructed in accordance with another embodiment of the disclosed technique. Sequence 200 includes cyclic timeslot schemes, of which two schemes 202 and 206 are shown. Timeslot scheme 202 includes timeslots $204_1$ and $204_2$. Timeslot scheme 206 includes timeslots $208_1$ and $208_2$. Timeslots $204_1$ and $208_1$, are allocated for downstream communication. Timeslots $204_2$ and $208_2$, are allocated for upstream communication and HN communication.

In the example set forth in FIG. 2, synchronizer 126 instructs gateways $122_1$, $122_2$ and $122_N$ and the nodes of their respective LANs that timeslots $204_1$ and $208_1$ are allocated for downstream communication only. Accordingly, only gateways $122_1$, $122_2$ and $122_N$ shall be able to transmit signals within their respective LANs $115_1$, $115_2$ and $115_N$, during timeslots $204_1$ and $208_1$. Synchronizer 126 further instructs gateways $122_1$, $122_2$ and $122_N$ and the nodes of their respective LANs, that timeslots $204_2$ and $208_2$ are allocated for upstream and HN communication only. Accordingly, only the nodes of intra-apartment networks $112_1$, $112_2$ and $112_N$ shall be able to transmit signals within their respective LANs $115_1$, $115_2$ and $115_N$, during timeslots $204_2$ and $208_2$.

For example, synchronizer 126 of FIG. 2 may include a clock (also known as a sync clock), which is coupled with the LAN-master nodes. The LAN-master nodes transmit data only during a certain part of the clock cycle (e.g., during the high level period of the cycle). Thus, the LAN-master nodes are synchronized with the clock, and hence are synchronized there between.

It is noted that the timeslot scheme may be determined dynamically. Accordingly, the timeslot scheme may change according to the conditions present in MxU network 100, such as the bandwidth used by each network node or LAN, the amount of upstream, downstream and HN communication, and the like. It is further noted that various other timeslot schemes may be employed, such as a timeslot scheme allocating separate timeslot for each LAN or group of LANs, a timeslot scheme involving only those LANs found interfering, and the like.

Figure 5B:
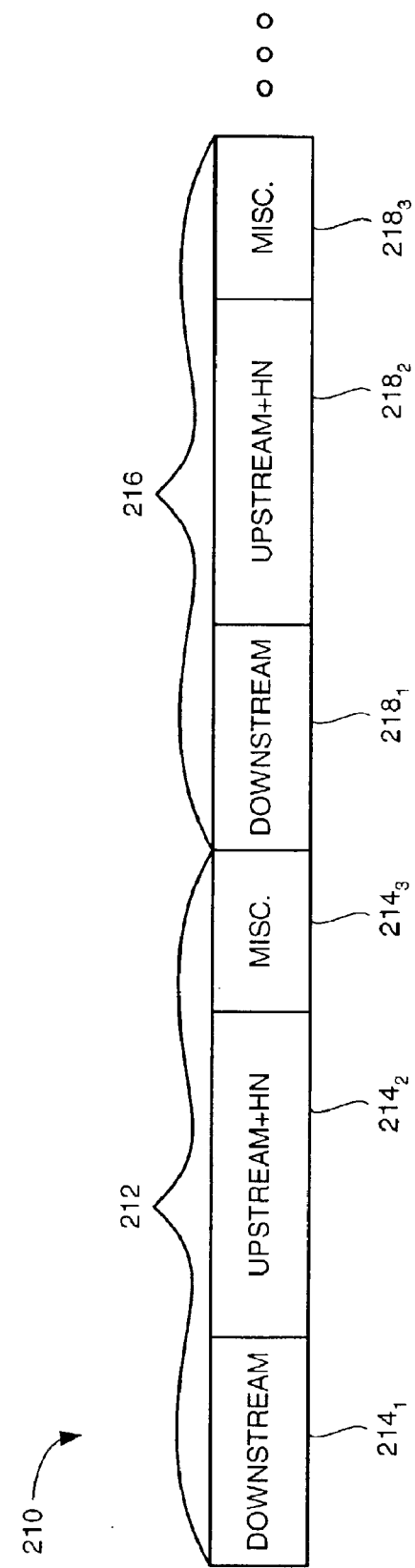
FIG. 5B is a schematic illustration of a timeslot scheme sequence, constructed in accordance with a further embodiment of the disclosed technique.

Reference is now made to FIG. 5B, which is a schematic illustration of a timeslot scheme sequence 210, constructed in accordance with a further embodiment of the disclosed technique. Sequence 210 includes repeating timeslot schemes, of which two schemes 212 and 216 are shown. Timeslot scheme 212 includes timeslots $214_1$, $214_2$ and $214_3$. Timeslot scheme 216 includes timeslots $218_1$, $218_2$ and $218_3$. Timeslots $214_1$ and $218_1$, are allocated for downstream communication. Timeslots $214_2$ and $218_2$, are allocated for upstream communication and HN communication (also referred to as upstream+HN). Timeslots $214_3$ and $218_3$ are allocated for other communication.

In the example set forth in FIG. 2, during timeslots $214_3$ and $218_3$, synchronizer 126 instructs gateways $122_1$, $122_2$ and $122_N$ and the nodes of their respective LANs, not to generate upstream, downstream, or HN data signals. For example, timeslot $214_3$ may be used for communication through the network, using a different communication specification, as shall be described with reference to FIG. 6C.

Figure 5C:
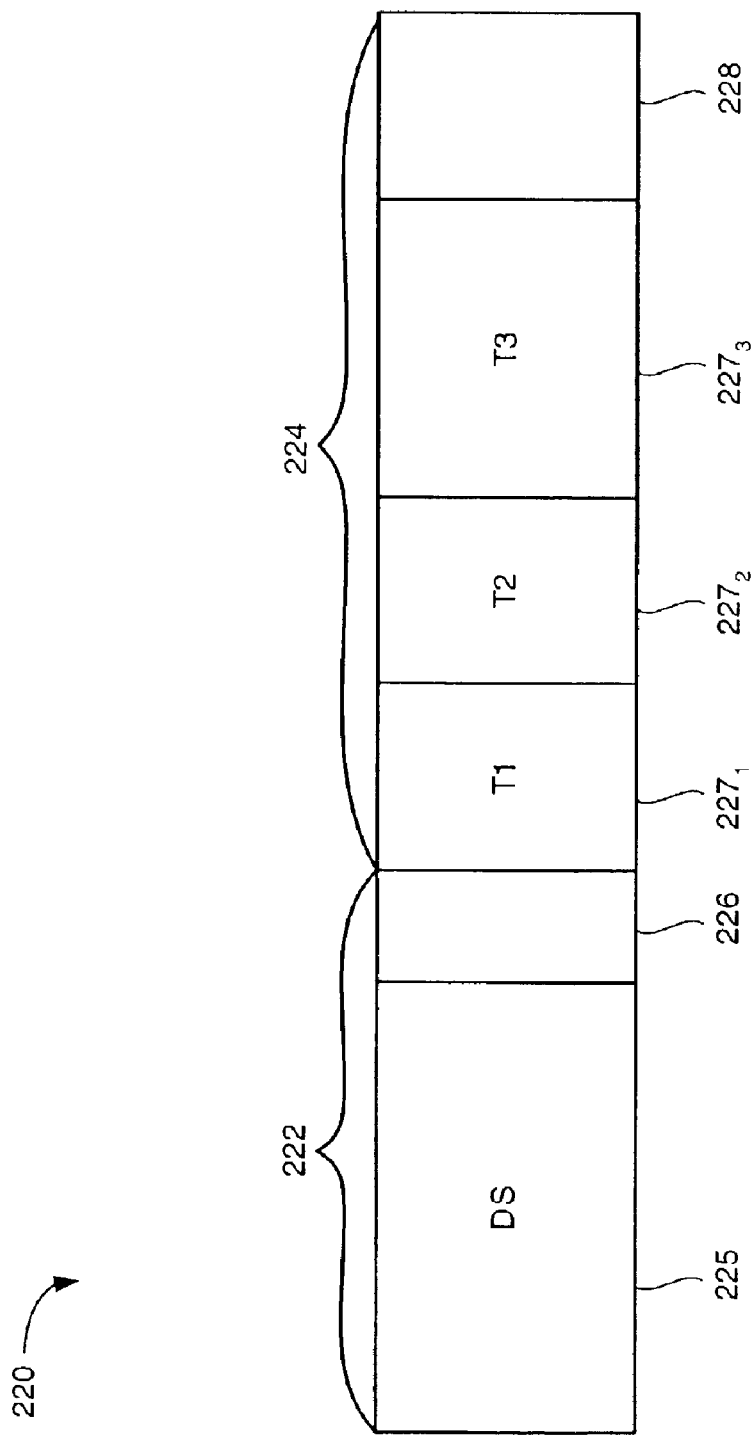
FIG. 5C is a schematic illustration of a timeslot scheme, constructed in accordance with another embodiment of the disclosed technique.

Reference is now made to FIG. 5C, which is a schematic illustration of a timeslot scheme sequence 220, constructed in accordance with another embodiment of the disclosed technique. Scheme sequence 220 includes timeslots 222 and 224. Timeslot 222 includes transmission opportunity (TXOP) 225 and gap 226. Timeslot 224 includes TXOPs $227_1$, $227_2$ and $227_3$, and gap 228.

Timeslot 222 is similar to timeslot $204_1$ of FIG. 5A, allocated for downstream communication. Timeslot 224 is similar to timeslot $204_2$ (FIG. 5A), allocated for upstream+HN communication. TXOP 225 is allocated for the transmission of a specific data packet or packets, in the downstream direction. Gap 226 separates between TXOP 225 and TXOP $227_1$. Each of TXOP $227_1$, $227_2$ and $227_3$ is allocated for specific upstream or HN transmission, such as a specific data stream or a specific network node or group of nodes. Gap 228 separates between TXOP $227_3$ and the next timeslot scheme (i.e., the next cycle). It is noted that a system according to the disclosed technique may generally operate using different types of TXOPs and gaps, such as those described in U.S. patent application Ser No. 10/127,693, which is hereby incorporated by reference.

Figure 6A:
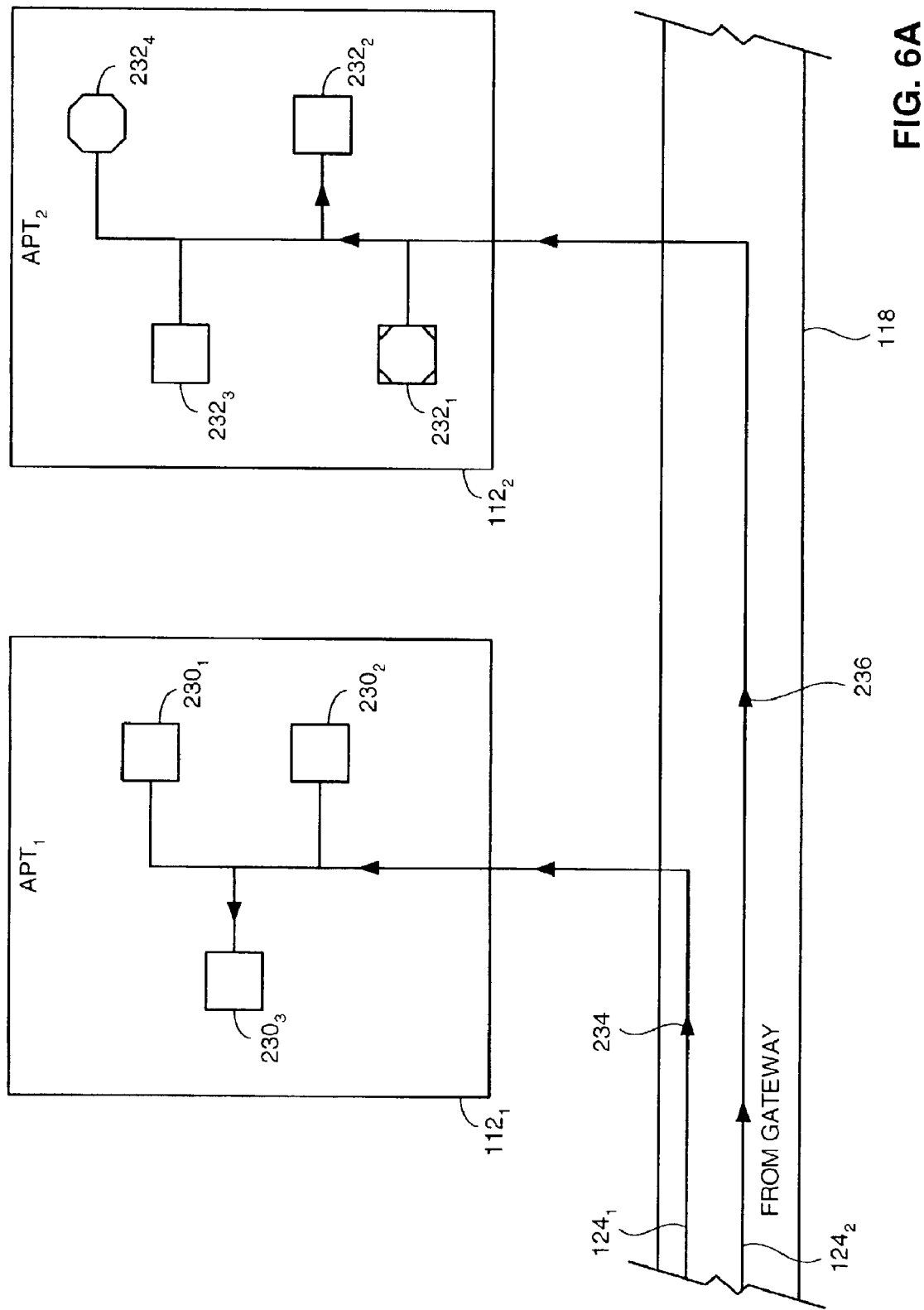
FIG. 6A is an illustration in detail of two of the intra-apartment networks of the MxU network of FIG. 2, and a portion of the binder, at a first mode of the MxU network, in accordance with a further embodiment of the disclosed technique.
Figure 6B:
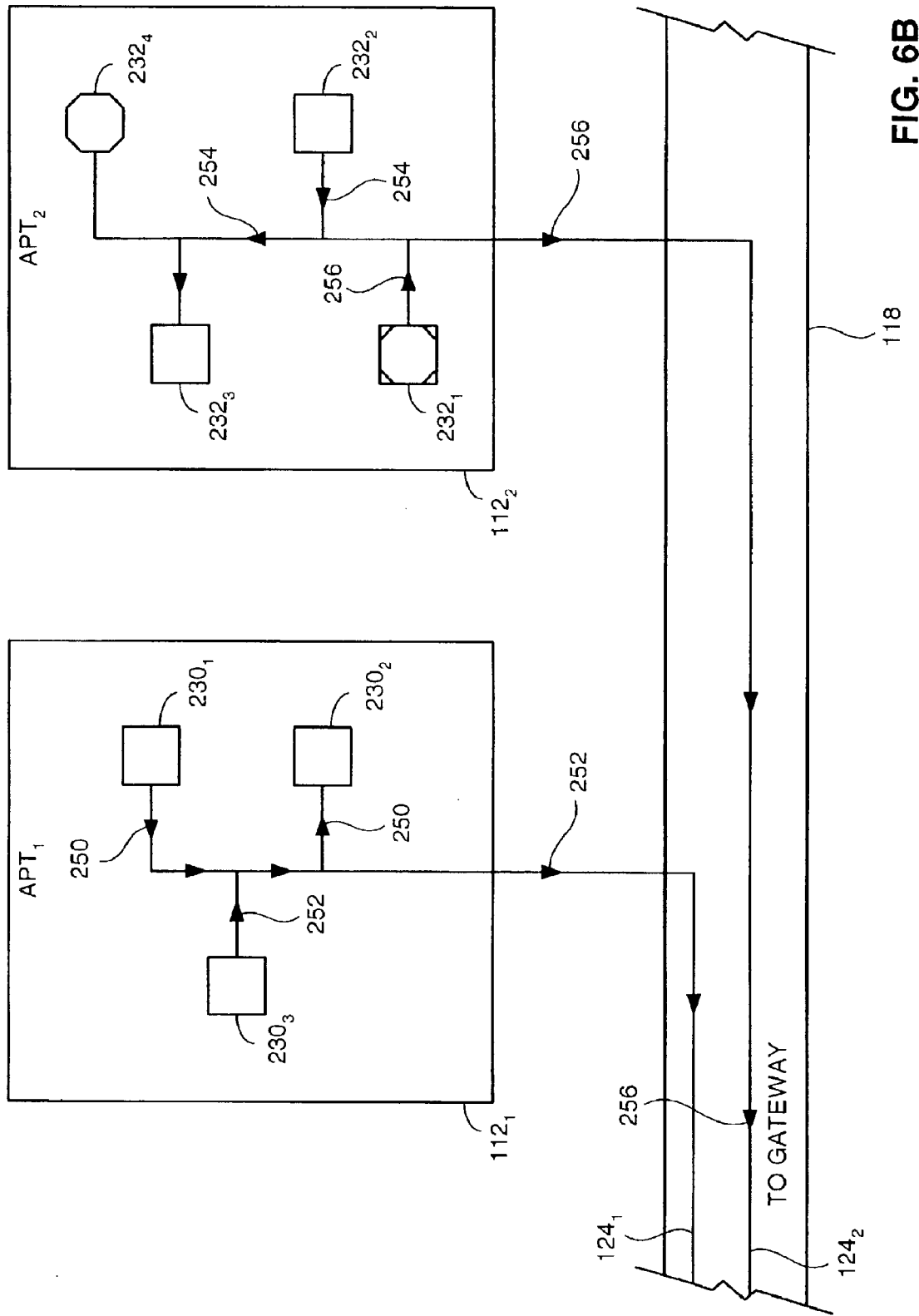
FIG. 6B is an illustration in detail of two of the intra-apartment networks of the MxU FIG. 2, and a portion of the binder, at a second mode of the MxU network, in accordance with another embodiment of the disclosed technique.

Reference is now made to FIGS. 6A, 6B and 6C. FIG. 6A is an illustration in detail of intra-apartment networks $112_1$ and $112_2$ of FIG. 2, and a portion of the binder 118, operating during a downstream timeslot such as timeslot $204_1$ of FIG. 5A, in accordance with a further embodiment of the disclosed technique. FIG. 6B is an illustration in detail of intra-apartment networks $112_1$ and $112_2$ of FIG. 2, and a portion of the binder 118, operating during an upstream+HN timeslot such as timeslot $204_2$ of FIG. 5A, in accordance with another embodiment of the disclosed technique. FIG. 6C is an illustration in detail of intra-apartment networks $112_1$ and $112_2$ of FIG. 2, and a portion of the binder 118, operating during an "miscellaneous" timeslot such as timeslot $214_3$ of FIG. 5B, in accordance with a further embodiment of the disclosed technique.

Intra-apartment network $112_1$ includes network nodes $230_1$, $230_2$ and $230_3$. Intra-apartment network $112_2$ includes network nodes $232_1$, $232_2$, $232_3$ and $232_4$. Nodes $232_1$, $232_2$, $232_3$ and $232_4$ are coupled there between via telephone wire $124_2$. It is noted intra-apartment networks $112_1$ and $112_2$ may further include various other elements, such as additional nodes and wires, switches, and the like.

Each of network nodes $230_1$, $230_2$, $230_3$, $232_1$, $232_2$, $232_3$ and $232_4$ may be any point in the network which can transmit and receive data, such as a computer, a printer, an intercom, a digital telephone, an electrical appliance, and the like. Nodes $230_1$, $230_2$, $230_3$, $232_2$, and $232_3$ transmit and receive data according to a single, synchronous, predetermined first communication specification, such as HPNA3. Nodes $230_1$, $230_2$, $230_3$, $232_2$, and $232_3$ may operate according to a synchronous Media Access Control (MAC) as described in the above mentioned U.S. patent application U.S. patent application Ser. No. 10/127,693.

Node $232_4$ transmits and receives data according to a second communication specification, such as HPNA2. It is noted that the second communication specification may be either synchronous or asynchronous. Node $232_1$ is capable of transmitting and receiving data signals of both the first and the second communication specification.

With reference to FIG. 6A, gateway $122_1$ transmits a data signal 234 through telephone wire $124_1$, toward node $230_3$ of intra-apartment network $112_1$. Simultaneously, gateway $122_2$ transmits another data signal 236 toward node $232_2$ of intra-apartment network $112_2$.

With reference to FIG. 6B, node $230_1$ of intra-apartment network $112_1$ transmits a first data signal 250 through telephone wire $124_1$, toward node $230_2$. Node $230_2$ of intra-apartment network $112_1$ transmits a second data signal 252 through telephone wire $124_1$, toward gateway $122_1$. Node $232_2$ of intra-apartment network $112_2$ transmits a third data signal 254 through telephone wire $124_2$, toward node $232_3$. Node $232_2$ of intra-apartment network $112_2$ transmits a fourth data signal 256 through telephone wire $124_2$, toward gateway $122_2$. Data signals 250 and 252 are transmitted synchronously, within LAN $115_1$ (FIG. 2), during at least one upstream+HN timeslot. Similarly, data signals 254 and 256 are transmitted synchronously, within LAN $115_2$ (FIG. 2), during at least one upstream+HN timeslot. With reference to FIG. 6C, network node $232_4$ transmits a data signal 270 through telephone wire $124_2$ to network node $232_1$.

It is noted that synchronizer 126 (FIG. 2) may restrict network node $232_1$ to transmit only during the miscellaneous timeslot, by creating conditions in network 100, which enable network node $232_1$ to transmit data signals only during the miscellaneous timeslot. For example, HPNA2 legacy units (i.e., nodes operating solely according to an older communication specification, and not according to later communication specification such as HPNA3 units), detect the various properties of the network (e.g., voltage, current, frequency spectrum) in order to determine if other nodes are transmitting. An HPNA2 node can transmit signals when it detects that no HPNA signal is being transmitted on the communication line. Hence, either the synchronizer (when directly coupled with the LANS) or the LAN-master nodes, can apply the appropriate signals on the network to prevent legacy units transmitting, during the downstream timeslots and the upstream+HN timeslots. Similarly, during the miscellaneous timeslot, either the synchronizer or the LAN-master nodes, can instruct the advanced (non-legacy) nodes, not to produce HPNA signals on the communication line, thereby allowing legacy units to transmit.

Figure 7:
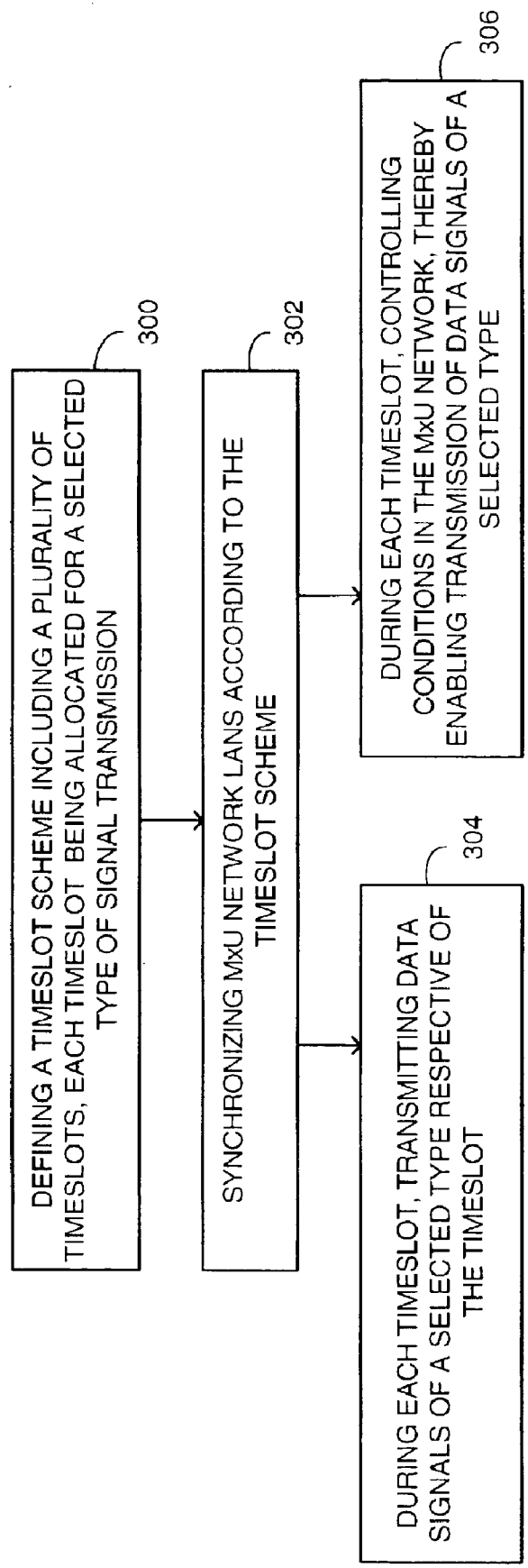
FIG. 7 is a schematic illustration of a method for reducing NEXT in an MxU network, operative in accordance with another embodiment of the disclosed technique.

Reference is now made to FIG. 7, which is a schematic illustration of a method for reducing NEXT in an MxU network, operative in accordance with another embodiment of the disclosed technique. In procedure 300, a timeslot scheme is defined. The timeslot scheme includes a plurality of timeslots, each being allocated for a selected type of signal transmission (i.e., upstream, downstream, HN, miscellaneous, or a certain combination thereof). In the example set forth in FIGS. 2, 5A and 5B, a timeslot scheme such as $204_1$ or $214_1$ is either embedded in synchronizer 116 or defined in real-time thereby. It is noted that alternatively, other sources may define the timeslot scheme, such as a node of MxU network 100, an external node of the WAN, a user of MxU network 100, and the like. In the example set forth in FIG. 5A, timeslot $204_1$ is allocated for downstream transmission, and timeslot $204_2$ is allocated for upstream and HN transmission.

In procedure 302, MxU LAN-masters are synchronized according to the timeslot scheme. The synchronization causes the nodes in each of the LANs to operate as defined in the timeslot scheme. With reference to FIG. 2, synchronizer 116 instructs each one of the LAN-master nodes of MxU network 100 to regulate their respective LANs according to the selected timeslot scheme. Accordingly, gateways $122_1$, $122_2$ and $122_N$ are allowed to transmit upstream signals only during timeslot $204_1$. Similarly, the nodes of intra-apartment networks $112_1$, $112_2$ and $112_N$ are allowed to transmit upstream+HN signals only during timeslot $204_2$.

In procedure 304, signals of a selected type are transmitted, during each of the respective timeslots. With reference to FIG. 2, gateways $122_1$, $122_2$ and $122_N$ transmit upstream signals only during timeslot $204_1$ and the nodes of intra-apartment networks $112_1$, $112_2$ and $112_N$ transmit upstream+HN signals only during timeslot $204_2$. It is noted that procedure 304 is applied repetitively.

In procedure 306, conditions on the network are controlled, thereby enabling transmission of data signals of special types, such as legacy communication signals. In the example set forth in FIGS. 2 and 5B, synchronizer 126 produces no HPNA signals on the MxU network, during the downstream and upstream+HN timeslots, and an appropriate HPNA signal during miscellaneous timeslot $214_3$. The HPNA signal indicates to legacy units that they are not allowed to transmit, as long as they detect it.

It is noted that procedure 306 is optional, and may be omitted in certain networks. For example, in a network comprising solely of nodes operating according to a single communication specification (i.e., non-legacy nodes), there may be no need to control the conditions on the network. It is noted that when applying procedure 306, it has to be integrated with procedure 304, so that both procedures are provided simultaneously. Timeslot scheme 212 (FIG. 5B) is an example for integrating both procedures 304 and 306.

It will be appreciated by persons skilled in the art that the disclosed technique is not limited to what has been particularly shown and described hereinabove. Rather the scope of the disclosed technique is defined only by the claims, which follow.

What is claimed is:

1. An HPNA (Home Phoneline Networking Alliance) MXU network for an MxU (broadband network for multi-users), the MxU network comprising:
a plurality of HPNA LANs (local area networks), each of said HPNA LANs operating according to a synchronous communication specification, each of said HPNA LANs comprising a plurality of nodes, one of said nodes within each HPNA LAIN being a gateway node, a selected one of said nodes within each HPNA LAN being defined a LAN-master node, each said HPNA LANs being coupled with a WAN (wide area network), via said respective gateway node, wherein communication lines within said HPNA LANs, directly coupled to said gateway nodes, are at least partially bound together, wherein the transmission direction within a selected HPNA LAN, by said respective gateway node, is defined downstream, wherein the transmission direction within a selected HPNA LAN, to said respective gateway node, is defined upstream, wherein the transmission direction within a selected HPNA LAN, between nodes other than said respective gateway nodes, is defined as HN, wherein said LAN-master nodes allow said gateway nodes to transmit downstream signals during at least one timeslot, and wherein said LAN-master nodes allow said nodes other than said gateway nodes to transmit upstream signals or HN signals, during at least another timeslot.

2. The HPNA MxU network according to claim 1, wherein for at least one of said LANs, said respective gateway node is integrated with said respective LAN-master node.

3. The HPNA MxU network according to claim 1, further comprising a synchronizer, synchronizing said LAN-master nodes according to said timeslots.

4. The HPNA MxU network according to claim 3, wherein said synchronizer comprises a clock, said clock coupled with a plurality of said LAN-master nodes.

5. The HPNA MxU network according to claim 1, wherein each of said LANs operate according to a single timeslot scheme, simultaneously.

6. The HPNA MxU network according to claim 5, wherein said timeslot scheme comprises:

a downstream timeslot, allocated for transmission of downstream data signals; and an upstream+HN timeslot, allocated for transmission of upstream and HN data signals.

7. The HPNA MxU network according to claim 6, wherein said timeslot scheme further comprises a miscellaneous timeslot, allocated for transmission of miscellaneous data signals, said miscellaneous data signals associated with a second communication specification.

8. The HPNA MxU network according to claim 7, wherein said miscellaneous data signals are associated with a legacy HPNA specification.

9. The HPNA MxU network according to claim 5, at least one of said LANs further comprising at least one legacy node, said at least one node operating according to a second communication specification.

10. The HPNA MxU network according to claim 5, wherein said timeslot scheme is determined dynamically.

11. The HPNA MxU network according to claim 1, wherein said synchronous communication specification is HPNA3.

12. The HPNA MxU network according to claim 1, wherein said MxU is taken from the list consisting of:

an MDU (multi-dwelling unit);

an MTU (multi-tenant unit);

an MPU (multi-public unit);

an MCU (multi-company unit);

an MEU (multi-embedded unit); and an MHU (multi-hospitality unit).

13. A synchronizer for synchronizing a plurality of HPNA MxU network LAN-masters therebetween, the synchronizer comprising:

means for coupling said synchronizer with said LAN-masters;

means for allocating timeslots, according to a timeslot scheme, to said LAN-masters, said timeslots determining when each of a plurality of nodes of said HPNA MxU network are enabled to transmit upstream, downstream and HN data signals.

14. The synchronizer according to claim 13, wherein said means for allocating timeslots comprises at least a clock.

15. The synchronizer according to claim 13, further being incorporated within one of said plurality of HPNA MxU network LAN-masters.

* * * * *